United States Patent [19]

McDonough

[11] Patent Number: 5,243,931
[45] Date of Patent: Sep. 14, 1993

[54] PET GROOMING RESTRAINT DEVICE

[76] Inventor: Richard W. McDonough, P.O. Box 43371, Cincinnati, Ohio 45243

[21] Appl. No.: 897,330

[22] Filed: Jun. 11, 1992

[51] Int. Cl.$^5$ .............................................. A01K 13/00
[52] U.S. Cl. .................................................. 119/158
[58] Field of Search ................... 119/19, 101, 158, 159

[56] References Cited

U.S. PATENT DOCUMENTS

| | | | |
|---|---|---|---|
| 1,760,017 | 5/1928 | Smoot | 119/158 |
| 1,879,915 | 9/1932 | Smoot | 119/158 |
| 2,438,979 | 9/1932 | Short | 119/101 |
| 2,536,943 | 5/1949 | Kessel | 119/158 |
| 2,611,341 | 9/1952 | Paris | 119/158 |
| 3,023,734 | 3/1962 | Schaub | 119/158 X |
| 3,413,958 | 10/1966 | Artig | 119/15 |
| 3,749,064 | 7/1973 | Weinstein et al. | 119/158 |
| 3,867,906 | 2/1976 | Johnson | 119/158 |
| 4,020,796 | 5/1977 | Grifa | 119/158 |
| 4,056,078 | 11/1977 | Blafford et al. | 119/158 |
| 4,057,032 | 11/1977 | Dimitriadis | 119/158 X |
| 4,083,328 | 4/1978 | Baker | 119/158 |
| 4,317,431 | 3/1982 | Sparkes | 119/158 |
| 4,407,234 | 10/1983 | Kleman | 119/158 |
| 4,930,453 | 6/1990 | Laliberte | 119/158 |
| 4,977,857 | 12/1990 | Slawinski | 119/19 |

FOREIGN PATENT DOCUMENTS 2396504 3/1979 France ......................... 119/158

*Primary Examiner*—Robert P. Swiatek
*Attorney, Agent, or Firm*—Wood, Herron & Evans

[57] ABSTRACT

A tub-like container having at least one access hole on at least one side wall, with the access hole being covered by a sheet of resilient material having at least one slit formed therethrough. A harness arrangement is located within the container for restricting up and down movement and back and forward movement of a harnessed pet while allowing the pet relatively unrestricted side-to-side movement within the container. A showering system is also located within the container to facilitate washing of the pet. A removable wheeled platform can be mounted to the bottom of the container to facilitate transporting the container with or without the pet harnessed inside.

20 Claims, 2 Drawing Sheets

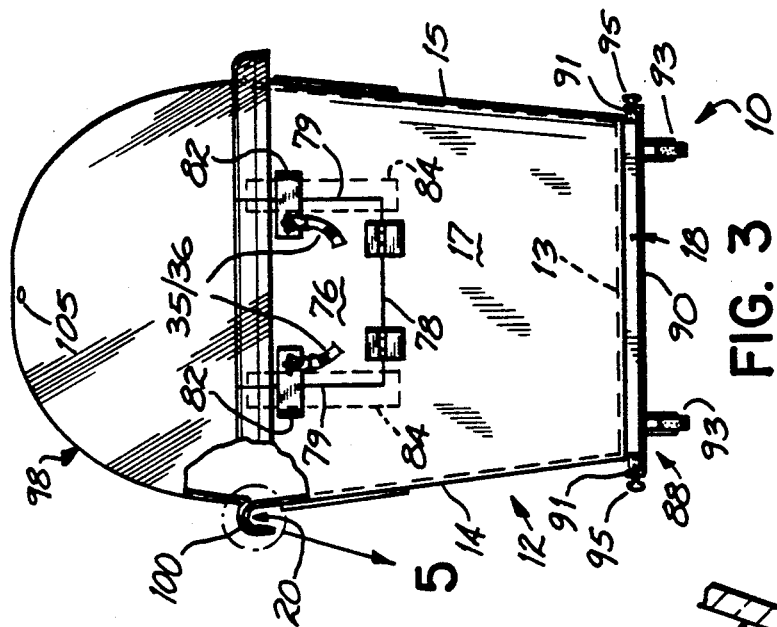
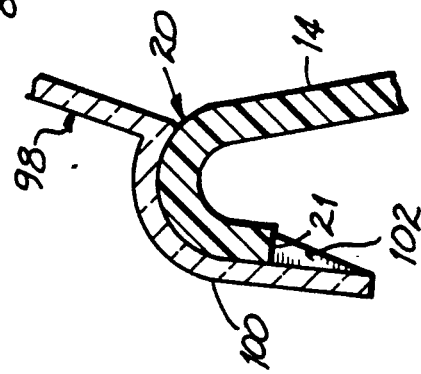
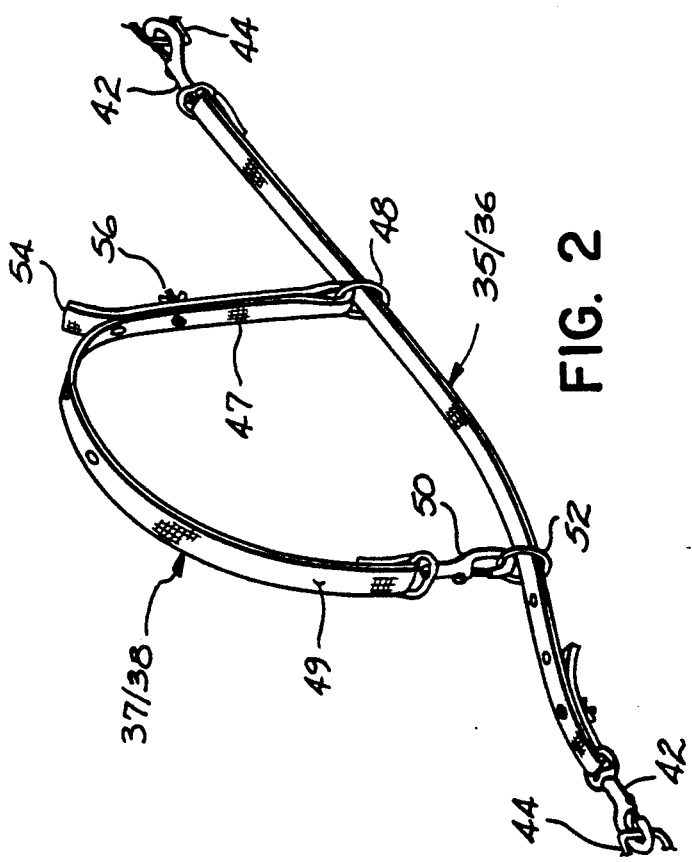
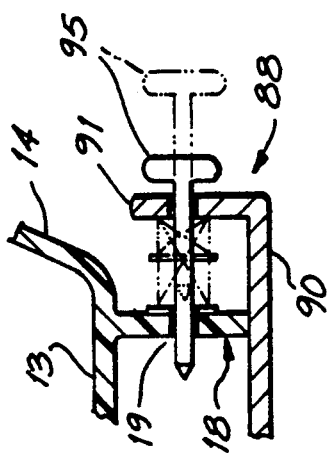

PET GROOMING RESTRAINT DEVICE

FIELD OF THE INVENTION

This invention relates to pet grooming devices and particularly to such a device which restrains the pet during grooming procedures such as washing, brushing, nail clipping, etc.

BACKGROUND OF THE INVENTION

When pets are bathed or washed, soap and water is typically splashed over the surrounding area and the person bathing the pet. Compounding this problem, pets such as dogs or cats have a natural tendency to shake off or spray excess water before they can be dried. In addition, some pets just refuse to remain stationary during any type of grooming activity.

One way pets like dogs can be bathed is in an open shower. Commercial pet grooming salons are known to use this method. In such a situation, the groomer is particularly exposed to the risk of being bitten, scratched, knocked down or otherwise harmed by the pet, in addition to the inconvenience of being soaked by the shower. Therefore, a grooming device is needed which safely and simply restrains the pet during grooming and contains the soap and water associated with bathing the pet.

Various pet grooming devices have been developed in an attempt to solve these problems as disclosed, for example, in U.S. Pat. Nos. 1,879,915; 2,438,979; 3,023,734; 4,020,796; 4,407,234 and 4,930,453. With some of the devices disclosed in these patents, the pet is enclosed in a container having four walls, a bottom and a top. A groomer has access to the pet through access holes formed in the walls which are dimensioned to allow passage of the groomer's arm. These devices also have showering systems located within their walls. These showering systems are typically connected to a water source located outside the container.

One potential problem with pet grooming devices of the type disclosed in the patents noted above involves the access holes formed in the walls of the container which enable a person to contact the pet while the showering system is in operation. If the access holes in the container walls do not seal, water from the showering system as well as the soap or other cleaning medium being used is likely to splash out of the container through these access holes. In U.S. Pat. No. 4,930,453, for example, rubber gloves are mounted to the access holes to create a seal and keep the groomer dry. But, there are a number of problems associated with the use of such gloves. For example, having to modify or specially produce gloves which are mountable to the holes can be costly. In addition, wearing gloves while bathing the pet can impede efforts to properly clean the pet by reducing the bather's sense of touch, limiting the bather's freedom of movement, etc. As an alternative to rubber gloves, U.S. Pat. No. 4,407,234 discloses a grooming device in which an iris-shaped closure of flexible waterproof material is mounted to each hole. These closures have an opening which may be expanded or contracted by means of a circular adjusting ring. However, this structure is also relatively costly to produce and can be cumbersome to use.

Another feature of many of the pet grooming devices disclosed in the patents mentioned above is a restraint system such as a harness arrangement which is intended to secure and limit the movement of the pet while in the container. A number of these harness arrangements use straps in various configurations which allow the pet varying degrees of freedom to move within the container. However, none of these harnesses permits the pet to move from side-to-side or laterally within the container, i.e., toward and away from the access holes used by the groomer, while still securely restraining the pet from moving forward and backward toward either end of the container (i.e., longitudinally) or up and down within the container (i.e., vertically). Because the access holes are on the sides of the container, a harness arrangement which limits side-to-side movement could hinder efforts to groom the animal. In addition, a harness which allows longitudinal or vertical movement could increase the risk of the groomer being soiled or even harmed by the pet, as well as hinder grooming efforts.

A number of the grooming devices of the type described above also have wheels mounted on the bottom of the container. While having wheels on the bottom of the container can facilitate transporting the container from one location to another, they can also make keeping the container stationary difficult, for example, when the container is placed on an incline.

SUMMARY OF THE INVENTION

It is, therefore, among the objectives of the present invention to provide a container for grooming and otherwise treating pets, such as dogs, and particularly the washing thereof, which is easy to use and relatively inexpensive to produce.

Another objective of the present invention is to provide a container into which a pet can be placed for grooming purposes which allows extensive access to the pet to facilitate grooming while at the same time protecting the groomer from being harmed by the pet.

A particular objective of this invention is to provide a pet grooming container which effectively and safely restrains the pet within the container while allowing side-to-side movement of the pet to facilitate grooming efforts.

An additional objective of this invention is to provide such a grooming container which allows access to a pet therein for washing while significantly preventing the wash water from splashing or otherwise contacting the attire of the groomer or the surrounding area during the washing process.

A further objective of the present invention is to provide a container for grooming a pet therein which can also be used to transport the pet from one location to another.

The objectives of the present invention are attained by providing a pet grooming device comprising a tub-like container having a bottom, two end walls and two side walls. At least one access hole is formed on at least one of the side walls. Each access hole is dimensioned to allow a human arm to pass through the hole and into the container. A harnessing arrangement is located within the container for restricting the up and down or vertical movement and forward and backward or longitudinal movement of a pet harnessed therein while allowing the pet freedom to move from side-to-side or laterally between the side walls of the container. A showering system is also located within the container to facilitate washing the pet. The showering system is connectable to a water supply located outside the container through a plumbing fixture mounted in one of the container walls. A drain can be formed in the bottom of the container to allow for easy draining of the container.

With this harness arrangement, the pet is sufficiently restrained to protect the groomer and to prevent movement which would hinder grooming efforts while at the same time the pet can be positioned closer or further from the access holes, to facilitate grooming. Preferably, this harness arrangement is attached around the pet's girth or mid-section and not its legs. Therefore, when the container is used to transport the pet, the harness arrangement helps to ensure that the pet is not harmed by allowing the animal freedom to adjust its stance and therefore giving it greater stability within the container.

Preferably, a sheet of rubber-like material is mounted over each access hole, with each sheet having at least one slit formed through it. The slit forms an opening to allow a human arm to pass through the sheet, through the access hole, and into the container. Preferably, the opening formed by the slit stretches so that the size of the slit can be minimized to limit the amount of wash water or other fluid in the container that splashes or otherwise exits through the access holes while still affording the groomer's arm sufficient freedom of movement to perform the desired grooming.

One feature of the present invention is dimensioning the container to fit within a standard bathtub. This enables the pet to be washed indoors and the waste water easily drained into the tub.

An additional feature of the present invention is the use of an openable lid for a top to the container. The openable lid provides additional protection against escape or splashing of the cleaning liquid while still allowing easy access to the pet for such grooming steps as brushing or final drying after washing the pet. Preferably, the lid is made transparent so that the pet can be viewed when the lid is closed, for example during washing.

Another feature of the present invention is the use of an access door formed in one of the walls of the container to make it easier to get the pet inside the container. This feature is especially helpful when larger dogs are being groomed.

A further feature of the present invention is a wheeled platform which is removably mounted to the bottom of the container. Having wheels mounted to the bottom of the container can aid in transporting the container with or without a pet harnessed inside. The removability of the wheeled platform can be helpful in a number of situations. For example, without the wheels, the container is less likely to move from a desired location, such as when the container is on an incline.

BRIEF DESCRIPTION OF THE DRAWINGS

The structure, operation and advantages of the presently preferred embodiment of this invention will become further apparent upon consideration of the following description taken in conjunction with the accompanying drawings wherein:

FIG. 2 is an enlarged perspective view of the basic straps of the harness arrangement of the device of FIG. 1;

FIG. 3 is a back view, partially broken away and sectioned, of the device of FIG. 1;

FIG. 4 is an enlarged partially sectioned view along lines 4—4 of FIG. 1; and

FIG. 5 is an enlarged sectional view of the circled area 5 of FIG. 3.

DETAILED DESCRIPTION OF THE INVENTION

Figure 1:
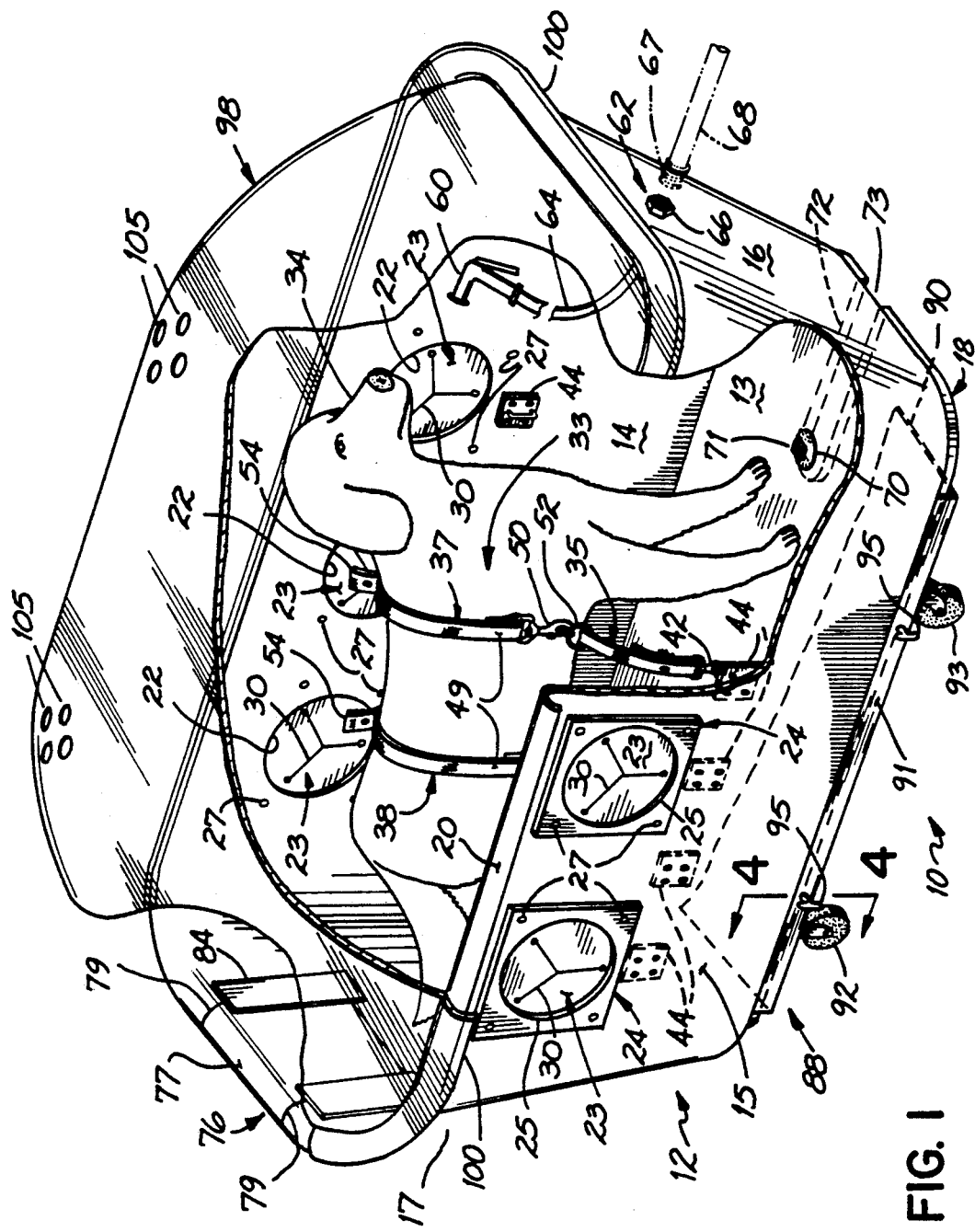
FIG. 1 is a perspective view, partially broken away, of a pet grooming device according to this invention with a wheeled platform removably mounted to the bottom of the device.

Referring to FIG. 1, a pet grooming device 10 is illustrated comprising a container 12 of single unit construction having a bottom 13, a first side wall 14, a second side wall 15, a first end wall 16 and a second end wall 17. Preferably, a rim 18 is formed around the bottom 13, With at least two latching holes 19 formed therethrough on either side of the container 12. In addition, the tops of the container walls 14-17 are shaped to form a rounded upper lip 20 having a free edge 21. The container 12 is preferably dimensioned to fit within a standard bathtub with its walls 14-17 tapering inwardly from their top edge toward the bottom 13. As used herein, the terms "top" and "upper" refer to the vertically uppermost portion of container 12 as viewed in the Figs., wherein the terms "bottom" and "lower" refer to the opposite direction.

The pet grooming device 10 according to this invention is designed for grooming and transporting four-legged pets and preferably dogs. For the purposes of example only, this invention will be described with respect to a container 12, sized for a large pet such as a German Shepherd; however, it is understood that the pet grooming device 10 of this invention can be dimensioned to accommodate various size pets.

In the presently preferred embodiment, at least two access holes 22, and preferably three access holes 22, are formed through each of the side walls 14 and 15. Each access hole 22 is dimensioned to allow a groomer's arm to pass through the hole and into the container 12. A sheet of rubber-like material 23 is mounted over each of the access holes 22 by a face plate 24. The face plate 24 has a hole 25 formed therethrough, preferably having a diameter equal to that of the access holes 22, which is aligned with its respective access hole 22. The face plates 24 are mounted to the side walls 14 and 15 of the container 12 with fasteners 27, for example nuts and bolts, with the sheet 23 sandwiched therebetween. Each sheet 23 has at least one slit 30 which is positioned and dimensioned to allow a groomer's arm to pass through the slit 30, through the access hole 22 and into the container 12. Preferably, each sheet 23 has three slits 30 which are circumferentially spaced and converge at a common point located generally in the center of the access hole 22. It is best for the sheets 23 to be formed of a resilient enough material to allow the opening formed by the slits 30 to stretch so that the size of each slit 30 can be minimized to limit the amount of wash water that splashes or otherwise exits through the access holes 22 while still affording the groomer's arm sufficient freedom of movement to perform the desired grooming.

A harness arrangement 33 restricts the up and down or vertical movement and the backward and forward or longitudinal movement between end walls 16, 17, of a harnessed pet 34, while allowing the pet 34 relatively unrestricted side-to-side or lateral movement between the side walls 14, 15 of the container 12. The harness arrangement 33 includes a least a first lateral strap 35 and a second lateral strap 36, with each strap 35, 36 extending laterally between the side walls 14, 15, and being spaced apart longitudinally inside the container 12. The ends of each lateral strap 35, 36 are removably mounted or anchored to opposite side walls 14, 15 generally the same vertical level and longitudinal position. A first looping strap 37 is slidably mounted on the first lateral strap 35, and a second looping strap 38 is slidably mounted on the second lateral strap 36, such that each of the looping straps 37 and 38 is slidable along the length of its respective lateral strap 35 and 36. When the pet 34 is properly strapped within the harness 33, as described in further detail hereafter, the first straps 35 and 37 encircle the mid-section of the pet 34 just behind its front legs and the second straps 36 and 38 encircle the mid-section of the pet 34 just in front of its back legs.

Referring to FIG. 2, each end of each of the lateral straps 35 and 36 preferably mounts a spring-loaded quick release latch hook 42 which can be removably anchored to one of a plurality of spaced ring brackets 44 mounted longitudinally along the side walls 14, 15 of the container 12 (see FIG. 1). One end of each of the looping straps 37 and 38 mounts a ring 48 which is disposed around its respective lateral strap 35 and 36. The other end of each of the looping straps 37 and 38 mounts a spring-loaded quick release latch hook 50, which is removably mounted to another ring 52 also disposed around its respective lateral strap 35 and 36. The length of each of the looping straps 37 and 38 is adjustable, for example, by overlapping varying lengths 54 of each looping strap 37 and 38 around its respective ring 48 and then fastening the length 54 to the balance of its looping strap 37 and 38, with at least one fastener 56, such as a wingnut and bolt. Preferably, each of the lateral straps 35 and 36 is also adjustable, for example, in the same manner.

By mounting a plurality of spaced apart brackets 44 lengthwise along each side wall 14 and 15, the first straps 35, 37 and second straps 36, 38 can be mounted at various longitudinal locations along the side walls 14, 15 in order to accommodate different length pets 34. In addition, because of the adjustability of the straps, the same harness arrangement 33 can be used to secure a variety of different size pets, for example big chested or slim chested dogs and short legged or long legged dogs. If desired, an additional lateral strap and looping strap (not shown) can be mounted between the two side walls 14 and 15 in position to encircle the pet's neck and thereby restrict the movement of the pet's head. This may be desirable, for example, in commercial grooming applications where the temperament of the pet 34 is not known.

A shower head 60, preferably with an integral flow control mechanism, is connected to a plumbing fixture 62 mounted in the first end wall 16 of the container 12 by a first length of flexible hose 64. A female fitting 66 of the plumbing fixture 62 is located outside the container 12 for receiving the male fitting 67 of a second length of flexible hose 68 connected to a water supply (not shown). A drain hole 70 is formed through the bottom 13 of the container 12, with a drain plug 71 disposed therein. Preferably, a rib 72 forms a channel 73 on the container bottom 13 around the drain hole 70 for directing the flow of waste water and other fluids out from under the container 12. With the container 12 dimensioned to fit within a standard bathtub, the pet 34 can be washed indoors and the waste water easily drained into the bathtub through drain hole 70. When the container 12 is reduced in size to accommodate small pets, it may be awkward to use the access holes 22 with the container 12 down in a bathtub. Therefore, the smaller version of container 12 can be modified with suction cups (not shown) mounted to its bottom 13 for securing the container 12 to, for example, a counter top next to a sink. The waste water could then be drained into the sink.

Referring to FIGS. 1 and 3, an optional access door 76 is formed from a section of the second end wall 17 to make it easier for the pet 34 to enter the container 12. The access door 76 has an upper edge 77, a lower edge 78 and two side edges 79. The access door 76 is hinged along its lower edge 78 to the container 12, thereby allowing the access door 76 to be swung downwardly to an open position. A conventional latching mechanism 82, such as a standard padlock latch, can be used to secure the upper end of each side edge 79 to the balance of the side wall 17 to maintain the door 76 in a closed position (as shown in FIGS. 1 and 3). Preferably, a strip of rubber-like sheet material 84 is mounted inside the container 12 along each side edge 79 to reduce the likelihood of wash water or other fluids leaking out from around the door 76 when in the closed position.

Referring to FIGS. 1, 3 and 4, a wheeled platform or frame 88 is removably mounted to the bottom 13 of the container 12. The wheeled platform 88 is preferably shaped like a tray having a bottom 90 and at least two side walls 91. Two laterally spaced stationary caster wheels 92 are mounted at one end and at least one, and preferably two, swivel caster wheels 93 are mounted at the other end to the bottom 90 of the frame 89. The platform 88 is dimensioned to receive the bottom rim 18 between its side walls 91. The platform 88 can be removably mounted to the container 12 with latches 95, for example at least two spring-biased latch pins positioned through each side wall 91 to engage one of the latching holes 86 on the bottom rim 18.

Referring to FIGS. 1, 3, and 5, the pet grooming 10 device preferably includes a removable lid 98 which forms a top to the container 12. Preferably, the lid 98 is transparent so that the pet can be viewed when the lid 98 is closed, for example during washing, and has air holes 105 formed therethrough for the comfort of the pet 34. The lid 98 has a bottom rim 100 which is securable to the upper lip 20 of the container 12, by some form of latching mechanism. For example, the bottom rim 100 of the lid 98 can be formed to match the contour of the container upper lip 20 and include a detent 102 formed along each side of the bottom rim 100 for engagement with the free edge 21 of the lip 20 along each of the side walls 14 and 15. The lid 98 is preferably made of a resilient plastic material which is bendable to allow the detents 102 to be forced over the free edge 21 along each of the side walls 14 and 15, and to provide a biasing force to maintain the engagement of each detent 102 with the free edge 21 of lip 20.

With the lid 98 removed from the container 12, one of the latch hooks 42 on each lateral strap 35 and 36 is disconnected from its bracket 44, and each latch hook 50 of the looping straps 37 and 38 is disconnected from its respective ring 52, the pet, such as a dog 34 can be either lifted into the container 12 or, after being unlatched, allowed to step into the container 12 through the access door 76. Once inside the container 12, the dog 34 can be secured within the harness arrangement 33 by positioning the first lateral strap 35 under the dog's mid-section just behind its front legs and the second lateral strap 36 likewise under the dog's mid-section, but just in front of its back legs. The unhooked latch hook 42 of each lateral strap 35 and 36 is then re-secured to its respective bracket 44. Each looping strap 37 and 38 is then extended over the back of the dog and its latch hook 50 re-secured with its respective ring 52. Once harnessed in this manner, vertical and longitudinal movement of the dog will be restricted while the pet will be free to move from side-to-side or laterally between the side walls 14, 15 of container 12. The degree to which the dog's movement is restricted vertically and longitudinally is affected by how loose or how snug the straps 35–38 are adjusted around the dog's mid-section. If desired, in order to accommodate different size dogs 34, especially different height dogs, each lateral strap 35 and 36 can be extended over the back of the dog 34 and its respective looping strap 37, 38 looped under the mid-section of the dog 34.

This harness arrangement restrains the dog 34 for the groomer's protection and to restrict movement which could hinder grooming efforts. At the same time, the dog 34 can be positioned closer or further from the access holes 22, whichever facilitates grooming.

If desired, the lid 98 can be secured and placed on top of the container 12 by positioning the bottom rim 100 of the lid 98 above the lip 20 of the container 12, engaging the detent 102 on one side of the bottom rim 100 with the corresponding free edge 21 of the lip 20 and then pushing down on the other side of the lid 98 and its corresponding bottom rim 100, forcing the other detent 102 past the free edge 21 of lip 20 on the other side of the container 12 until engagement occurs.

With or without the lid 98 in place, access to the dog 34 for grooming purposes is afforded by the access holes 22 through slits 30. With the lid 98 in place, the groomer is afforded additional protection from, for example, being bitten by the dog 34 or getting wet when the dog is being washed. With the lid 98 removed, access to the dog 34 is made easier for such grooming steps as brushing or final drying after the dog is washed.

With the wheeled platform 88 latched to the bottom 13 of the container as previously described, the container 12 can be more easily transported from one location to another, with or without the dog 34 being harnessed within. When the dog 34 is harnessed and the container 12 is used to transport the dog, the harness arrangement 33 helps to ensure that the dog 34 is not harmed in that it allows the animal freedom to adjust its stance, therefore giving it greater stability within the container 12, while at the same time providing support against sudden movements. As an aid in moving the container 12 when it is mounted on the wheeled platform 88, a strap arrangement like one of the lateral straps 35 and 36 can be latched to the two latching mechanisms 82 and used as a handle to pull the container 12 to the desired location (see FIG. 3).

While this invention has been described with reference to a preferred embodiment, it will be understood by those skilled in the art that various changes may be made and equivalents may be substituted for elements thereof without departing from the scope of the invention. In addition, many modifications could be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the appended claims.

What is claimed is:

1. A pet grooming device, comprising:
   a container having a bottom, two end walls and two side walls, at least one of said side walls having at least one access hole formed therethrough, said at least one access hole being dimensioned to receive a human arm;
   harnessing means located within said container for restricting the up and down movement and forward and backward movement of a harnessed pet while allowing unrestricted side-to-side movement of the pet between the side walls of said container so that the pet is readily accessible to a groomer through said at least one access hole;
   showering means located within said container for directing a cleaning fluid onto the pet; and
   a drain.

2. The grooming device of claim 1 wherein at least the side walls of said container taper inwardly, toward one another, in a direction toward the bottom of said container, said container being thereby placable in a bathtub.

3. The grooming device of claim 1 wherein said container has an upper lip and said device includes a removable lid with a bottom rim which is sealable to said upper lip by some form of latching mechanism.

4. The grooming device of claim 3 wherein said lid is transparent.

5. The grooming device of claim 1 wherein said harnessing means comprises at least two lateral straps and at least two looping straps, each of said straps having two ends, each of said lateral straps extending laterally between said side walls, with the ends of each of said lateral straps being connected to opposite side walls of said container and said lateral straps being spaced from one another longitudinally within said container, and the ends of each of said looping straps being slidably mounted to one of said lateral straps.

6. The grooming device of claim 5 wherein the length of each of said looping straps is adjustable.

7. The grooming device of claim 5 wherein at least one of the ends of each of said lateral straps is removably mounted to said container.

8. The grooming device of claim 5 wherein the length of each of said lateral straps is adjustable.

9. The grooming device of claim 1 wherein one of said walls has an access door formed therein.

10. A pet grooming device, comprising:
    a container having a bottom, two end walls, and two side walls, at least one of said side walls having at least one access hole formed therethrough, said at least one access hole being dimensioned to receive a human arm;
    at least one generally flat sheet of resilient material mounted over said at least one access hole, at least one slit being formed through said at least one sheet to allow a human arm to be inserted therethrough and into said container;
    harnessing means located within said container for restricting the up and down movement and forward and backward movement of a harnessed pet while allowing unrestricted side-to-side movement of the pet between the side walls of said container so that the pet is readily accessible to a groomer through said at least one access hole;

showering means located within said container for directing a cleaning fluid onto the pet; and a drain.

11. The grooming device of claim 10 wherein said at least one sheet has three radial slits circumferentially spaced and converging at a common point located generally in the center of said at least one access hole.

12. The grooming device of claim 10 wherein the walls of said container taper inwardly, toward one another, in a direction toward the bottom of said container, said container being thereby placeable in a bathtub.

13. The grooming device of claim 10 wherein one of said walls has an access door formed therein.

14. The grooming device of claim 10 wherein said container has an upper lip and said device includes a removable lid with a bottom rim which is sealable to said upper lip by some form of latching mechanism.

15. The grooming device of claim 14 wherein said lid is transparent.

16. A pet transport and grooming device, comprising:
a container having a bottom, two end walls, two side walls, and an openable lid, at least one of said side walls having at least one access hole formed therethrough, said at least one access hole being dimensioned to receive a human arm;
at least one generally flat sheet of resilient material mounted over said at least one access hole, at least one slit being formed through said at least one sheet to allow a human arm to be inserted therethrough and into said container;
harnessing means located within said container for restricting the up and down movement and forward and backward movement of harnessed pet while allowing unrestricted side-to-side movement of the pet between the side walls of said container so that the pet is readily accessible to a groomer through said at least one access hole; and
a removable wheeled platform mounted to the bottom of said container.

17. The grooming device of claim 16 wherein said wheeled platform comprises:
a frame having a bottom and two ends, said frame being dimensioned to receive the bottom of said container;
means for removably securing said frame to said container; and
two spaced wheels mounted to the bottom of and adjacent to one end of said frame, and at least one wheel mounted to the bottom of and adjacent to the other end of said frame.

18. The grooming device of claim 16 wherein a bracket is mounted on the outside of one end of said container for receiving a handle strap to aid in moving said container.

19. The grooming device of claim 16 wherein the walls of said container taper inwardly, toward one another, in a direction toward the bottom of said container, said container being thereby placeable in a bathtub.

20. The grooming device of claim 16 wherein one of said walls has an access door formed therein.

* * * * *